US010984800B2

(12) United States Patent
DeLuca et al.

(10) Patent No.: US 10,984,800 B2
(45) Date of Patent: Apr. 20, 2021

(54) PERSONAL ASSISTANT DEVICE RESPONSES BASED ON GROUP PRESENCE (71) Applicant: INTERNATIONAL BUSINESS MACHINES CORPORATION, Armonk, NY (US)

(72) Inventors: Lisa Seacat DeLuca, Baltimore, MD (US); Jeremy A. Greenberger, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 179 days.

(21) Appl. No.: 16/119,189

(22) Filed: Aug. 31, 2018

(65) Prior Publication Data
US 2020/0075022 A1 Mar. 5, 2020

(51) Int. Cl.
G10L 17/00 (2013.01)
G10L 25/84 (2013.01)

(52) U.S. Cl.
CPC .............. G10L 17/00 (2013.01); G10L 25/84 (2013.01)

(58) Field of Classification Search
USPC .................................... 704/246, 231, 1–504
See application file for complete search history.

(56) References Cited

U.S. PATENT DOCUMENTS

| 9,104,886 | B1 | 8/2015 | Dolbakian et al. | |
|---|---|---|---|---|
| 9,197,736 | B2* | 11/2015 | Davis | H04M 1/72583 |
| 9,542,564 | B2* | 1/2017 | Mattox, Jr. | G06F 21/62 |
| 10,573,312 | B1* | 2/2020 | Thomson | G10L 15/30 |
| 2011/0043652 | A1* | 2/2011 | King | G06F 40/194 348/222.1 |
| 2014/0245462 | A1* | 8/2014 | Mattox, Jr. | H04L 63/102 726/28 |
| 2015/0199523 | A1 | 7/2015 | Hamilton et al. | |

(Continued)

OTHER PUBLICATIONS

Nick, "Use Nearby to interact with what's around you", Google Support, Accessed Aug. 16, 2018, 5 pages,<support.google.com/accounts/answer/6260286>.

(Continued)

Primary Examiner — Marcus T Riley
(74) Attorney, Agent, or Firm — Jay Wahlquist; Andrew D. Wright; Roberts Calderon Safran & Cole, P.C.

(57) ABSTRACT

Systems and methods for dynamically generating filtered audio responses based on the presence of one or more on-site participants are disclosed. In embodiments, a computer-implemented method comprises: identifying, by a computing device at a site, one or more on-site participants in a user session; receiving, by the computing device, input from a select participant of the one or more on-site participants; determining, by the computing device, context from the input; accessing, by the computing device, privacy settings of the select participant, wherein the privacy settings are associated with restricted participant data; determining, by the computing device, that the one or more participants match the restricted participant data associated with the context; and outputting, by the computing device, a filtered audio response, wherein the filtered audio response is based on the context of the input and the privacy settings of the select participant.

5 Claims, 4 Drawing Sheets (56) References Cited

U.S. PATENT DOCUMENTS

| | | | | |
|---|---|---|---|---|
| 2016/0034249 | A1* | 2/2016 | Lee | G06F 3/012 |
| | | | | 704/275 |
| 2016/0357970 | A1 | 12/2016 | Dow et al. | |
| 2017/0132199 | A1 | 5/2017 | Vescovi et al. | |
| 2017/0318075 | A1* | 11/2017 | Liensberger | H04L 67/025 |
| 2018/0018373 | A1* | 1/2018 | Yazdian | G06Q 10/10 |
| 2018/0165593 | A1* | 6/2018 | Stolarz | G06F 16/242 |
| 2020/0075022 | A1* | 3/2020 | DeLuca | G10L 17/00 |

OTHER PUBLICATIONS

Nichols, "At your service: 8 personal assistant robots coming home soon", zdnet.com, Accessed Aug. 16, 2018, 8 pages, <zdnet.com/pictures/at-your-service-8-personal-assistant-robots-coming-home-soon/>.

* cited by examiner

PERSONAL ASSISTANT DEVICE RESPONSES BASED ON GROUP PRESENCE

BACKGROUND

The present invention relates generally to computer-based personal assistants and, more particularly, to dynamically generating personal assistant responses based on the presence of one or more on-sites participants.

Virtual assistants such as personal assistants come in a variety of forms, and generally function as personal information managers. Personal assistants may be in the form of smart speakers or devices including voice recognition software and audio response capabilities. Some examples of personal assistants include Amazon Alexa™ and Google Home™. As smart devices gain in popularity, a variety of personal assistants have been developed which interface with one or more smart devices to provide information management as well as smart device control features. Personal assistants may be programmed to recognize verbal or text-based commands, and reply with an appropriate response. For example, a personal assistant may recognize a voice command or query of a user and respond with an appropriate audio answer to the command or query. Personal assistants may recognize individual users and respond to an individual user's commands/queries accordingly. For example, a personal assistant may access a music play list associated with a particular user's voice in response to a voice command from the user.

SUMMARY

In an aspect of the invention, a computer-implemented method includes: identifying, by a computing device at a site, one or more on-site participants in a user session; receiving, by the computing device, input from a select participant of the one or more on-site participants; determining, by the computing device, context from the input; accessing, by the computing device, privacy settings of the select participant, wherein the privacy settings are associated with restricted participant data; determining, by the computing device, that the one or more participants match the restricted participant data associated with the context; and outputting, by the computing device, a filtered response, wherein the filtered response is based on the context of the input and the privacy settings of the select participant.

In another aspect of the invention, there is a computer program product comprising a computer readable storage medium having program instructions embodied therewith. The program instructions are executable by a computing device to cause the computing device to: identify one or more on-site participants in a personal assistant user session; receive input from a select participant of the one or more on-site participants; determine context from the input; access privacy settings of the select participant, wherein the privacy settings are associated with restricted participant data; determine whether the one or more on-site participants match the restricted participant data associated with the context in the privacy settings of the select participant; and output an audio response, wherein the audio response is a filtered audio response when the one or more on-site participants match the restricted participant data associated with the context, and the audio response is a non-filtered audio response when the one or more on-site participants do not match the restricted participant data associated with the context, and wherein the filtered audio response contains content different from the content of the non-filtered audio response.

In another aspect of the invention, there is a system including a processor, a computer readable memory and a computer readable storage medium associated with a computing device. The system also includes: program instructions to identify, in an ongoing basis, one or more on-site participants in a personal assistant device user session; program instructions to receive input from a select participant of the one or more on-site participants; program instructions to determine context of the input; program instructions to determine that a privacy state is triggered based on the context of the input and the one or more on-site participants matching privacy settings of the select participant; and program instructions to output a filtered audio response to the input based on the privacy state, wherein the program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention relates generally to computer-based personal assistants and, more particularly, to dynamically generating audio responses based on the presence of one or more on-site participants. In embodiments, a method of communicating with a personal assistant is provided wherein the personal assistant determines the identity of all users of the personal assistant; recognizes a user command; determines that one or more of the identified users are unauthorized users (e.g., not authorized to hear certain information); and sends a filtered answer to the command that takes into account the presence of the unauthorized users. In embodiments, the personal assistant continuously determines the identify of all users within a pre specified distance of the personal assistant based on user volume levels detected by the personal assistant; determines a message is to be sent to the personal assistant users except those blocked from receiving messages on a pre specified topic; determines which personal assistant users are blocked; and sends a message to all of the personal assistant users except those which are blocked. In embodiments, a method of communicating with a personal assistant is provided wherein the personal assistant determines the presence of users nearby the personal assistant; recognizes a user command; determines that the user command is associated with sensitive information; and sends a filtered answer to the command that takes into account the presence of other users.

Presently, some personal assistants may distinguish between a plurality of users based on voice recognition as a method of selecting from individual user's personal information (e.g., music playlists, calendars, etc.). However, personal assistants may issue an audio response to a command that includes sensitive or private content. Advantageously, embodiments of the invention enable a personal assistant to maintain a session state (privacy state or default state) according to the people near the personal assistant in order to maintain proper context. Thus, aspects of the invention provide improvements to the functioning of a personal assistant. More specifically, aspects of the invention utilize unconventional steps of detecting users within a predetermined distance of the personal assistant and, based on the context of input from a user and the user's privacy settings, determining an appropriate filtered response to the input. Thus, a technical solution to the technical problem of digital content filtering is provided in the field of computer-based personal assistants.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
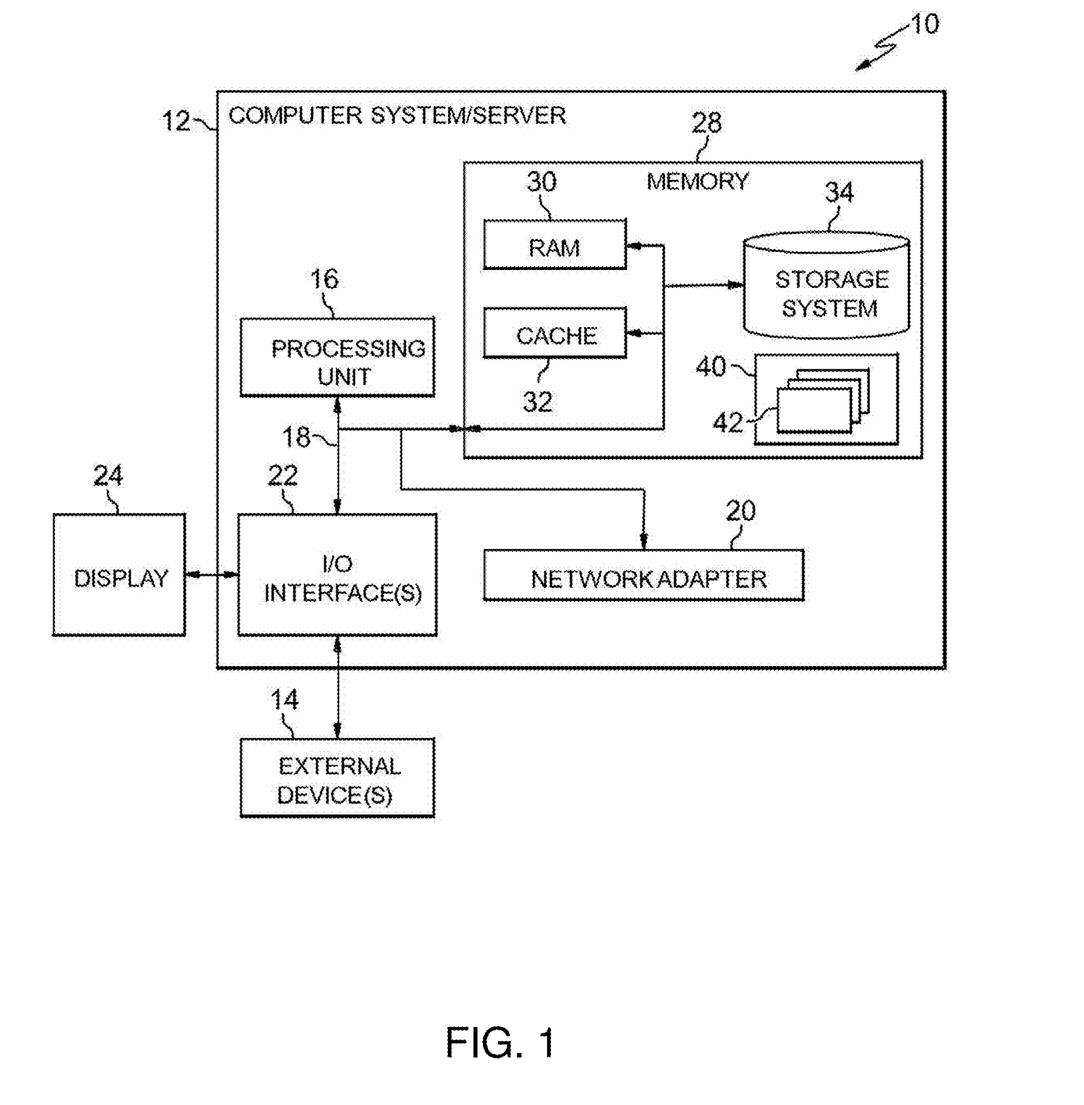
FIG. 1 depicts a computing infrastructure according to an embodiment of the present invention.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
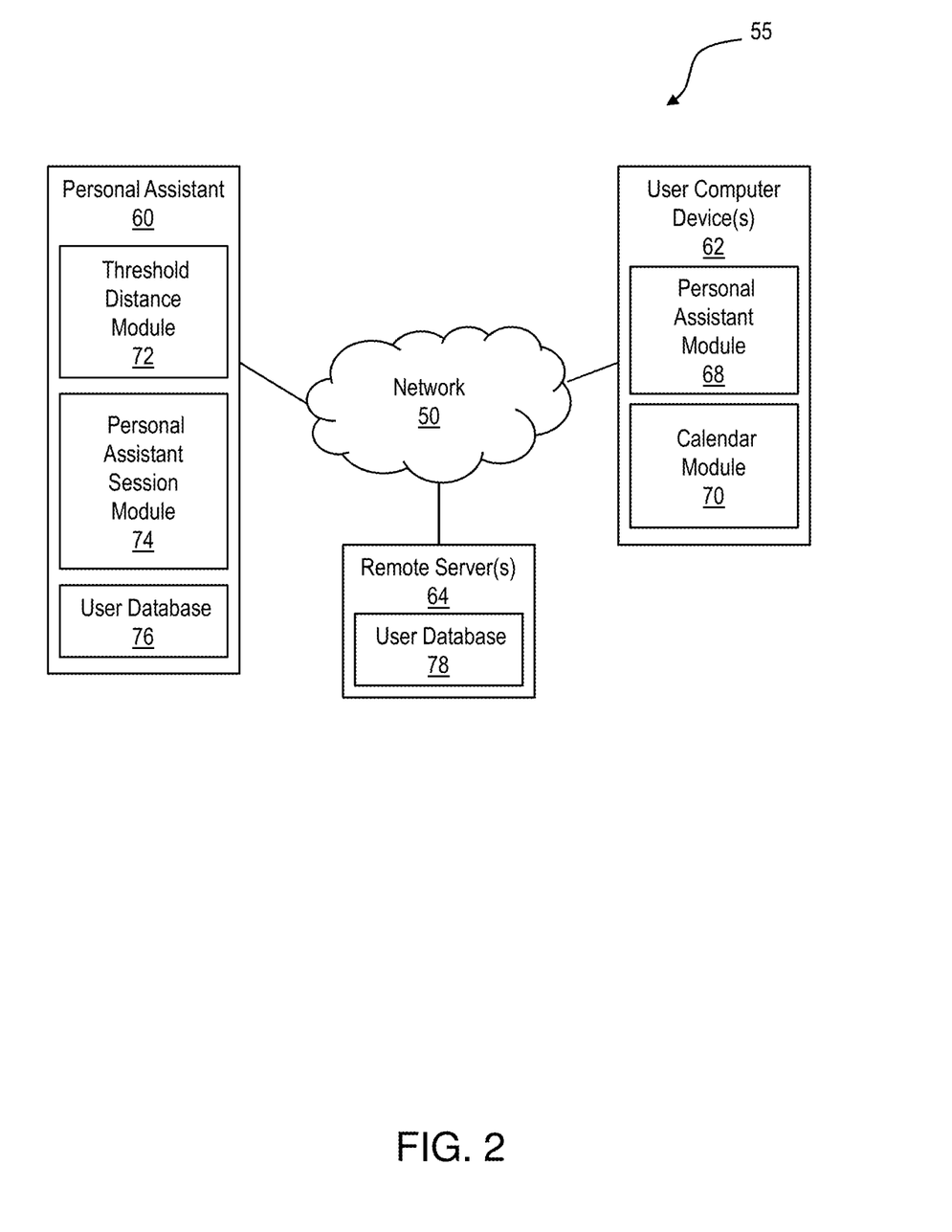
FIG. 2 shows an exemplary environment in accordance with aspects of the invention.

FIG. 2 shows an exemplary personal assistant device system 55 (hereafter personal assistant system 55) in accordance with aspects of the invention. In embodiments, the personal assistant system 55 includes a network 50 connecting a computer-based personal assistant 60 to one or more user computer devices 62 and/or remote servers 64. In aspects, the personal assistant 60 comprises a computer system 12 of FIG. 1, and is connected to the network 50 via the network adapter 20 of FIG. 1. In embodiments, the personal assistant 60 is configured as a special purpose computing device that is part of a virtual assistant infrastructure. Such infrastructure may include onsite and remote (e.g., cloud-based) components.

The network 50 may be any suitable communication network or combination of networks, such as a local area network (LAN), a general wide area network (WAN), and/or a public network (e.g., the Internet). In embodiments, the one or more user computer devices 62 are in the form of the computer system 12, and may be a desktop computer, laptop computer, tablet computer, smartphone, smartwatch, Internet of Things (IoT) device, smart appliance, etc. In embodiments, the one or more user computer devices 62 run a personal assistant application program on a personal assistant module 68 that provides an interface with the personal assistant 60. In aspects, the one or more user computer devices 62 contain one or more modules configured to perform functions, such as program modules (e.g., program module 42 of FIG. 1). For example, in aspects, a user computer device 62 includes a calendar module 70 configured to provide calendaring/scheduling functions to one or more users, including the storage and/or access of user calendar data.

In embodiments, the one or more remote servers 64 are in the form of the computer system 12, and may be specialized computing devices that are part of a virtual assistant infrastructure. For example, in aspects, the one or more remote servers 64 provide services to one or more customers who access the services through the personal assistant 60 via the network 50.

Still referring to FIG. 2, in embodiments, the personal assistant 60 includes one or more modules configured to perform one or more functions described herein, and the modules may include one or more program modules (e.g., program module 42 of FIG. 1) executed by the personal assistant 60. In embodiments, the personal assistant 60 includes a threshold distance module 72 configured to continuously or periodically determine the presence of one or more users (participants). In aspects, the personal assistant 60 includes a personal assistant session module 74 configured to: initiate a user session (e.g., recognize a voice command initiation), identify a user input/command, identify the user associated with the input/command, determine the context of the input/command, determine if one or more participants match privacy settings associated with the context (privacy state) or do not match privacy settings associated with the context (default state), and provide a response to the input/command based on the privacy or default state. In embodiments, both the threshold distance module 72 and the personal assistant session module 74 are configured to access user data in a user database 76 of the personal assistant 60. Alternatively or additionally, the personal assistant 60 may access user data in a remote user database, such as a database 78 of a remote server 64.

In embodiments, the personal assistant 60 includes additional or fewer components than those shown in FIG. 2. In embodiments, separate components are integrated into a single computing component or module. Additionally, or alternatively, a single component may be implemented as multiple computing components or modules.

Figure 3:
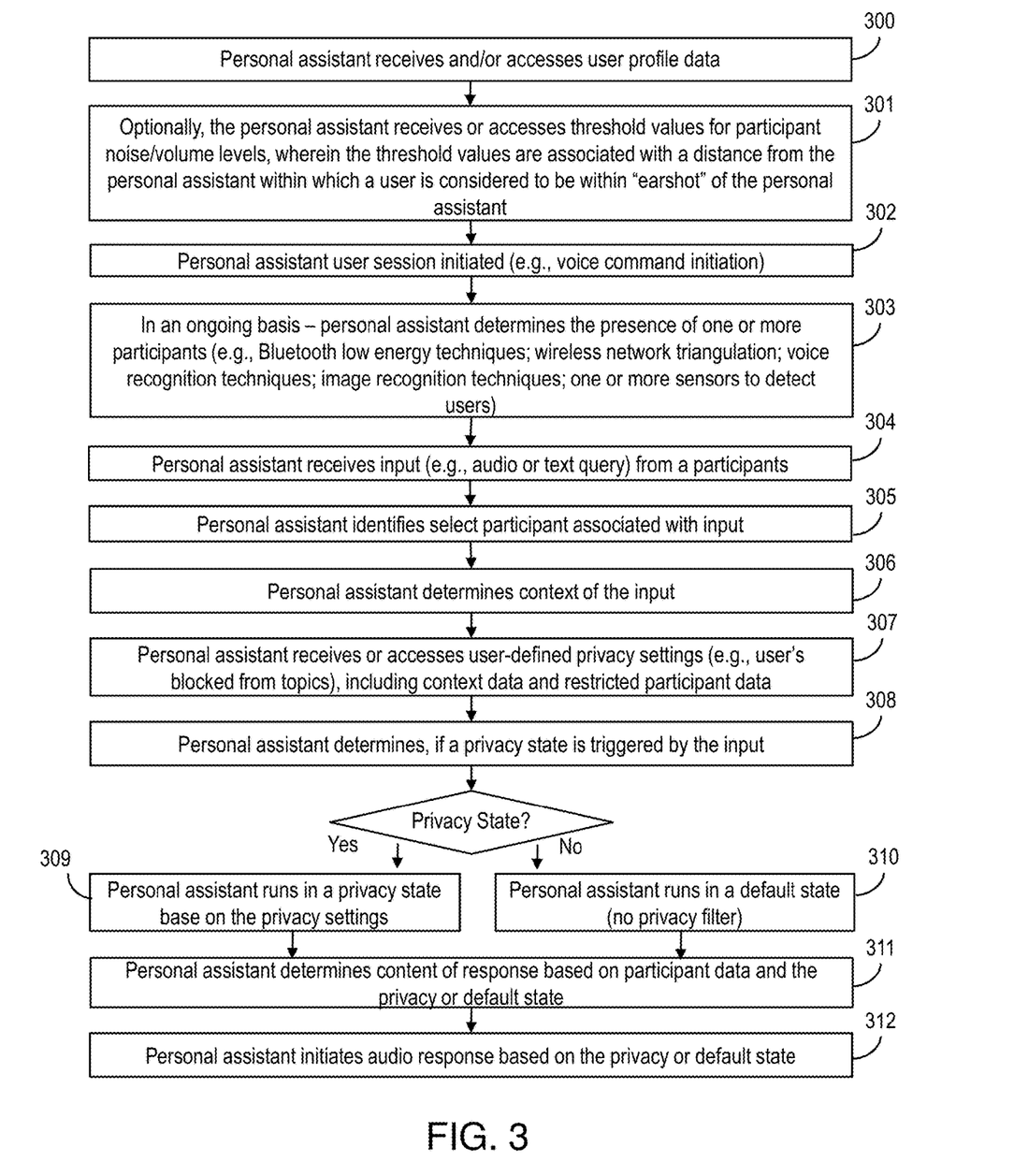
FIG. 3 shows a flowchart of steps of a method in accordance with aspects of the invention.

FIG. 3 shows a flowchart of a method in accordance with aspects of the invention. Steps of the method of FIG. 3 may be performed in the environment illustrated in FIG. 2, and are described with reference to elements shown in FIG. 2.

At step 300, the personal assistant 60 receives or accesses user profile data. In embodiments, the personal assistant 60 receives user profile data from one or more of the user computer devices 62. User profile data may include information regarding the user computer devices 62, user identity information (e.g., voice recognition data, passwords, computer device identification, etc.), permissions, preferences, or other user data. In aspects, the user profile data received at personal assistant 60 is saved in the user database 76. In embodiments, the personal assistant 60 accesses user profile data in a remote database, such as user database 78 of remote server 64.

At step 301, the personal assistant 60 optionally receives or accesses threshold values associated with distances within which a user is considered to be within earshot of the personal assistant 60. In aspects, the threshold values represent predetermined distances or ranges of distances from a personal assistant 60 within which a user is considered to be a participant in a personal assistant user session. In embodiments, threshold values are associated with volume levels of noise (e.g., volume of voices of users) detected at the personal assistant 60. Threshold values may be predetermined values generated by an administrator, values automatically calculated by a computer program product, or may be user-selected threshold values. In manual embodiments, a user selects a distance to be associated with each of a plurality of volume levels (e.g., volume of noise detected at the personal assistant 60) through a user interface of the personal assistant 60 or a user interface in communication with the personal assistant 60 (e.g., a user interface of a user computer device 62). For example, a user may input a selection indicating that a volume level of 5 should be associated with 20 feet from the personal assistant 60, and a volume of 6 should be associated with 26 feet from the personal assistant 60.

In some embodiments, the threshold values of step 301 are calculated utilizing an application, such as a smartphone app. For example, an application on a user computer device 62 in communication with the personal assistant 60 may enable a user to program ranges (distances from the personal assistant 60 to a user) by selecting noise volume levels for different locations within a physical space around the personal assistant 60. That is, as a user walks about a physical space, the user may associate certain distance ranges with certain volume levels (e.g., 5-10 feet from the personal assistant 60 is associated with volume number 2, etc.) using the smartphone app. In some embodiments, the personal assistant 60 utilizes wireless network triangulation (Wi-Fi triangulation) to determine if a user is within earshot of the personal assistant 60, by detecting whether a user computer device 62 of the user is within one or more virtual boundaries monitored by the personal assistant 60 or an associated user computer device 62. In such cases, the threshold values are defined by the virtual boundaries monitored by the personal assistant 60.

At step 302, the personal assistant 60 initiates a user session. It should be understood that existing methods for initiating a user session may be utilized in the implementation of step 302. In embodiments, the personal assistant 60 initiates a user session when a user voice command associated with the initiation of a user session is recognized by the personal assistant 60 (e.g. utilizing audio detecting/recognition software). For example, the personal assistant 60 may detect that a user has issued a command by speaking/invoking a name of the personal assistant 60.

At step 303, the personal assistant 60 determines the presence of one or more participants of the user session. In some embodiments, the personal assistant 60 identifies all participants of a user session. In aspects, the personal assistant 60 determines only the presence of one or more participants of the user session. The personal assistant 60 may identify participants based on user profile data stored in a user database (e.g., user databases 76 or 78) of the personal assistant system 55. In embodiments, participants are on-site participants who are physically present at the same location as the personal assistant 60. In aspects, one or more of the devices of the personal assistant system 55 identify one or more on-site participants of the user session based on the one or more participants being within a predetermined distance from the personal assistant 60. In embodiments, users outside of predefined threshold values (e.g., distances from the personal assistant 60 established at step 301) are not considered to be participants in the user session. In aspects, step 303 is performed on an ongoing (e.g., continuous) basis, such that the personal assistant 60 continuously updates the state of user presence/identification.

Various methods may be utilized by the personal assistant system 55 to determine the presence of participants in the user session at step 303. For example, in embodiments, Bluetooth low energy techniques are utilized by one or more devices of the personal assistant system 55 to detect the presence of a user (e.g., personal assistant 60 detects the presence a Bluetooth enabled user computer device 62 associated with a user within a predetermined distance of the personal assistant 60). Other methods of identifying participants and/or the presence of participants which may be utilized by the personal assistant system 55 include wireless network triangulation (Wi-Fi triangulation), voice recognition techniques, sensors (e.g. motion sensors, heat sensors, etc.) and image recognition techniques. For example, in aspects, the personal assistant system 55 utilizes user profile data saved in the user database 76 in conjunction with voice recognition software in order to identify users based on audio data detected by the personal assistant 60. In another example, digital cameras (not shown) associated with the personal assistant 60 provide the personal assistant 60 with image data for the physical location surrounding the personal assistant 60, and the personal assistant 60 or an associated user computer device 62 in the personal assistant system 55 utilizes image recognition techniques to sense or identify users within a predetermined threshold distance from the personal assistant 60 based on the image data. It should be understood that other methods of detecting users may be utilized in the implementation of step 303, and the present invention is not intended to be limited by the examples provided herein.

At step 304, the personal assistant 60 receives user input from a participant. The input may be in the form of audio input or text-based input. In embodiments, the personal assistant 60 utilizes voice recognition software to recognize audio input (e.g., a voice command) from a participant. In aspects, the input is the same input that initiated a user session at step 302 (e.g., a user voice command). Existing methods of detecting user personal assistant input may be utilized in the implementation of step 304.

At step 305, the personal assistant 60 identifies the select participant associated with the input of step 304. It should be understood that step 305 may be performed in conjunction with step 303. For example, in aspects the personal assistant 60 identifies a plurality of participants within a predetermined distance of the personal assistant 60 in accordance with step 303, and also identifies one of the plurality of participants as being the select participant that entered the input (e.g., voice command) in accordance with step 304. In embodiments, the personal assistant 60 identifies participants based on user profile data stored in a user database (e.g., user databases 76 or 78) of the personal assistant system 55.

At step 306, the personal assistant 60 determines the context of the input. For example, in aspects, personal assistant 60 utilizes voice recognition software to identify keywords indicative of the input subject matter using natural language processing. For example, the personal assistant 60 may recognize that audio input from the select user at step 304 is directed to obtaining calendar data, personal finance data, music playlist data, etc. In embodiments, the personal assistant 60 utilizes existing audio recognition techniques in the implementation of step 306. In embodiments, the personal assistant 60 utilizes a remote server 64 in the implementation of step 306 (e.g., a cloud-based context recognition system/service). It should be understood that step 306 may be performed in an ongoing basis as the personal assistant 60 receives input in accordance with step 304. Accordingly, in embodiments, the personal assistant 60 continuously updates a context state in accordance with step 306, as well as the user participant state in accordance with step 303.

At step 307, the personal assistant 60 receives or accesses user defined privacy settings (e.g., users blocked from topics), including context data and restricted participant data. The term restricted participant data as used herein refers to data identifying a user who is restricted from hearing/receiving certain content. For example, a user may indicate that their calendar data should not be available to any other participant. In another example, a user may indicate that data associated with a scheduled event on their calendar (e.g., a surprise party) should not be available to a particular user (e.g., the guest of honor of the surprise party). In aspects, the personal assistant 60 accesses user privacy settings based on the implementation of one or more of the steps 304-306 of FIG. 3. In embodiments, privacy settings are input directly into a personal assistant 60 (e.g., through a user interface of the personal assistant 60 or through a user interface of a user computer device 62 in communication with the personal assistant 60) or may be retrieved by the personal assistant 60 through the network 50. For example, the personal assistant 60 may access privacy settings of a calendar module 70 of the user computer device 62. Privacy settings may be saved in the user database 76 of the personal assistant 60, or may be saved on a remote device (e.g., user computer device 62).

At step 308, the personal assistant 60 determines if a privacy state is triggered by the input received at step 304. In embodiments, the personal assistant 60 determines if the context of the input (determined at step 306) matches subject matter of any of the select user's privacy settings. In embodiments, the personal assistant 60 also determines if the one or more participants identified at step 303 match restricted participant data of the select user's privacy settings. For example, in aspects, the personal assistant 60 determines that input is associated with calendar event data (context), and further determines that one of the participants of the user session matches a privacy setting (restricted participant data) blocking that participant from obtaining certain calendar event data. In this example, the personal assistant 60 determines that a privacy state is triggered based on the context of the input and the presence of a participant who is restricted with respect to the context. In embodiments, step 308 is determined in an ongoing basis, such that the state of personal assistant 60 may change as participants enter and exit a personal assistant user session. In another example, the personal assistant 60 determines that input is associated with personal bank account information, and further determines that a privacy setting blocks access to the personal bank account information when other participants are present. In this example, the personal assistant 60 determines that a privacy state is triggered based on the context of the input and the presence of another participant (other than the select participant associated with the input of step 304).

At step 309, if the personal assistant 60 determines that a privacy state is triggered at step 308, the personal assistant 60 initiates a privacy state based on the privacy settings. In aspects the privacy state results in the personal assistant 60 utilizing dedicated privacy state response algorithms and/or databases based on the privacy settings of the select user. In aspects, privacy state notifications are accessed by the personal assistant 60 in the privacy state, such as notifications to inform a user that a response to the input is a filtered response.

At step 310, if the personal assistant 60 determines that a privacy state is not triggered at step 308, then the personal assistant runs in a default state (i.e., no privacy filter is employed). In embodiments, the personal assistant 60 utilizes dedicated default state response algorithms and/or databases to formulate responses to the input when in the default state.

At step 311, the personal assistant 60 determines the content of a response to the input of step 304 based on the privacy state or the default state. For example, in embodiments, if the personal assistant 60 is in a privacy state, the content of a response to the input is determined based on algorithms and/or databases specific to the privacy state. Alternatively, in those same embodiments, if the personal assistant 60 is in the default state, the content of the response is determined based on algorithms and/or databases specific to the default state. In aspects, the content of a response based on the privacy setting is less than the content of a response based on the default setting. Existing personal assistant techniques for generating responses to user input may be incorporated by the personal assistant 60 into the performance of step 311. In aspects, the personal assistant 60 accesses user data of the select participant, and utilizes the user data to determine the content of the response in accordance with step 311. For example, the personal assistant 60 may access a select users calendar event data in the calendar module 70 of their user computer device 62 in order to determine the content of a response.

At step 312, the personal assistant 60 initiates a response (e.g., audio or text-based response) based on the privacy state or default state. If the personal assistant 60 is in the privacy state, the personal assistant 60 initiates a filtered response, wherein the content is filtered based on the privacy settings of the select participant from whom the input was received at step 304. If the personal assistant 60 is in the default state, the personal assistant 60 initiates a response in accordance with standard procedures/processes of the personal assistant 60. In aspects, a filtered response contains less content or different content from a non-filtered (default) response. In embodiments, the response contains content indicating that the response is filtered. In one example, the personal assistant 60 initiates a response "I have sent your account balance to your phone ending in 1234, as your inquiry involves sensitive information." For example, a filtered response may include the content "due to privacy settings, this response is filtered to include only publicly shareable content". In embodiments, a response is initiated by sending text-based non-filtered responses to all authorized participants (e.g., via their individual user computer devices 62), while unauthorized or blocked participants receive a filtered responses. In embodiments, an single filtered audio response is initiated based on the identify of the on-site participants.

While discussed with respect to a single input to the personal assistant 60, it should be understood that the above-identified steps may be conducted based on multiple user inputs. For example, the state of the personal assistant 60 (default state or filtered state) may be determined for each input of multiple inputs, and a response to each input generated by the personal assistant 60 accordingly. Thus, embodiments of the invention enable a personal assistant 60 to utilize real-time data from continuous monitoring of the personal assistant 60 surroundings to provide filtered or unfiltered responses to multiple participants appropriate to the circumstances (i.e., appropriate to the participants present based on privacy settings of the participant).

Figure 4:
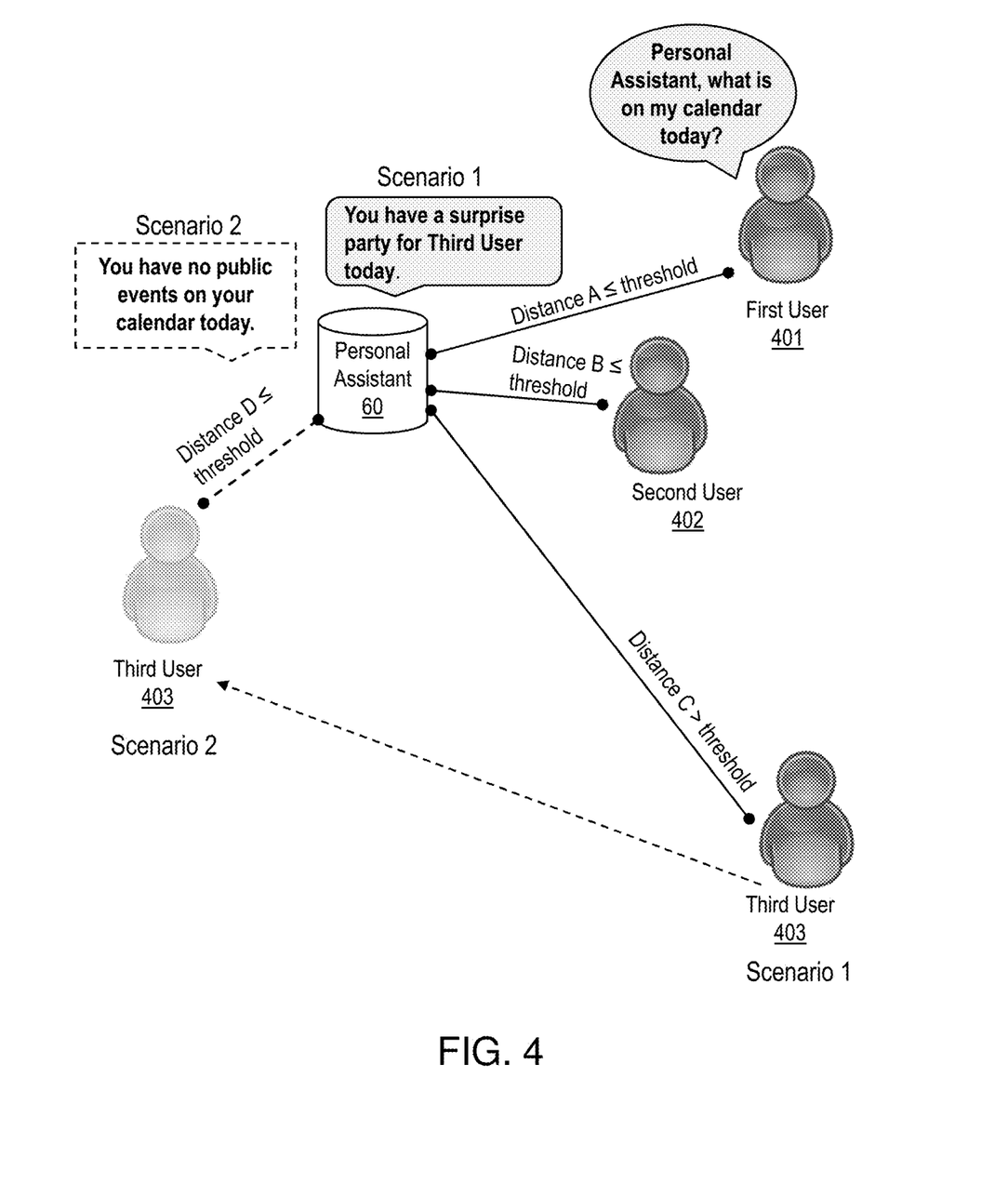
FIG. 4 illustrates exemplary use scenarios in accordance with embodiments of the invention.

FIG. 4 illustrates exemplary use scenarios in accordance with embodiments of the invention. The scenarios of FIG. 4 utilize steps from FIG. 3 and utilize elements from the personal assistant system 55 of FIG. 2.

In a first scenario of FIG. 4, the personal assistant 60 determines that the first user 401 and the second user 402 are within a predetermined threshold distance (distance A and distance B, respectively) of the personal assistant 60, and are therefore participants in a personal assistant users session in accordance with step 303 of FIG. 3. In this example, a third user 403 is initially outside of a predetermined threshold distance (distance C) and is therefore not considered a participant in accordance with step 303 of FIG. 3. For example, the personal assistant 60 may determine based on the speaking volume of the respective users 401-403 that the first and second users 401 and 402 are within a threshold distance of the personal assistant 60 and the third user 403 is outside of a threshold distance of the personal assistant 60. The personal assistant 60 receives input from the first user 401 in the form of the query "personal assistant, what is on my calendar today", in accordance with step 304 of FIG. 3. Initially, only the first and second users 401 and 402 are participants. Accordingly, the personal assistant 60 determines the context of the query is calendar event data, and further determines that there are no privacy settings for the first user 401 that match the context and participant data. That is, the personal assistant 60 determines that the privacy state of personal assistant 60 is not triggered by the input of the first user 401 based on the privacy settings of the first user 401 and the identify of the participants (first user 401 and second user 402), in accordance with step 308 of FIG. 3. Accordingly, the personal assistant 60 initiates a non-filtered audio response to the first user's query stating "you have a surprise party for Third User today", in accordance with step 312 of FIG. 3.

In a second scenario of FIG. 4, the third user 403 moves within a predetermined threshold distance D of the personal assistant 60, and is recognized by the personal assistant 60 as being a participant in the personal assistant user session in accordance with step 303 of FIG. 3. In this second scenario, the personal assistant 60 identifies the input of the first user 401 as being directed to calendar event data, and further determines that a privacy setting of the first user 401 indicates that a calendar event for a surprise party is not to be shared with the third user 403. Therefore, in this second scenario, the personal assistant 60 determines that a privacy state is triggered by the first user's input in accordance with step 308 of FIG. 3, and determines the content of a response to the input according to step 311 of FIG. 3. In accordance with step 312 of FIG. 3, the personal assistant 60 initiates a filtered audio response "you have no public events on your calendar today" based on the privacy state of the personal assistant 60. Thus, the embodiment of FIG. 4 provides a response appropriate for all listeners (first user 401, second user 402 and third user 403) based on the context of the input from the first user 401.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still another embodiment, the invention provides a computer-implemented method for dynamically generating filtered audio responses based on the presence of one or more on-sites participants. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a processor, a computer readable memory and a computer readable storage medium associated with a computing device;
   program instructions to identify, in an ongoing basis, on-site participants in a personal assistant device user session, the on-site participants including a first user and a second user;
   program instructions to receive input from the first user;
   program instructions to determine context of the input from the first user;
   program instructions to determine that a privacy state is triggered based on the context of the input, participation of the second user in the personal assistant device user session, and the second user matching user-defined privacy settings of the first user;
   program instructions to output a filtered audio response to the input of the first user based on the privacy state to prevent the second user from hearing information of the first user indicated in the user-defined privacy settings of the first user as being restricted with respect to the second user;
   program instructions to receive the user-defined privacy settings from the first user, wherein the user-defined privacy settings include data identifying the second user as being restricted from hearing calendar data of the first user;
   program instructions to access threshold values representing predetermined threshold distances from the computing device within which a user is considered to be an on-site participant in the personal assistant device user session; and
   program instructions to continuously monitor for a presence of the on-site participants, wherein the monitoring comprises utilizing image recognition techniques to identify users within one of the predetermined threshold distances from the computing device based on image data,
   wherein the program instructions are stored on the computer readable storage medium for execution by the processor via the computer readable memory.

2. The system of claim 1, further comprising:
   program instructions to detect a noise volume produced by users; and
   program instructions to determine that the noise volume from the users meets a predetermined threshold noise value indicating that the users are the on-site participants in the personal assistant device user session.

3. The system of claim 2, further comprising program instructions to receive the predetermined threshold noise value, wherein the predetermined threshold noise value indicates a distance between the users and the computing device within which the users are considered to be within a hearing distance of the computing device.

4. The system of claim 1, further comprising: program instructions to determine content of the filtered audio response a restricted participant indicating that the second user should not have access to context data associated with the restricted participant data.

5. The system of claim 1, wherein the identifying the on-site participants in the personal assistant device user session further comprises at least one of the techniques selected from the group consisting of: identifying one or more of the on-site participants associated with one or more user computer devices detected on-site; identifying one or more of the on-site participants using voice recognition analysis of audio data; and identifying one or more of the on-site participants using sensor data.

* * * * *